United States Patent [19]
Jankowski

[11] 3,910,307
[45] Oct. 7, 1975

[54] QUICK DISCONNECT FILTER COUPLING
[75] Inventor: Fred Jankowski, Huntsville, Ala.
[73] Assignee: The United States of America as represented by the Administrator of the National Aeronautics and Space Administration, Washington, D.C.
[22] Filed: May 30, 1974
[21] Appl. No.: 474,745

[52] U.S. Cl. .......... 137/515.3; 137/550; 251/149.6; 210/429
[51] Int. Cl.² ........................................ F16L 29/00
[58] Field of Search ..................... 251/149.6, 149.7; 137/614.04, 544, 550, 798, 515.3; 210/418, 419, 420, 429, 430, 431, 432, 446, 448

[56] References Cited
UNITED STATES PATENTS
| | | | |
|---|---|---|---|
| 2,966,371 | 12/1960 | Bruning | 137/614.04 X |
| 2,968,497 | 1/1961 | Treleman | 251/149.4 |
| 3,108,610 | 10/1963 | De See | 137/550 X |
| 3,178,022 | 4/1965 | Balogh | 210/448 X |
| 3,388,801 | 6/1968 | Boyd et al | 137/614.04 X |

*Primary Examiner*—William R. Cline
*Attorney, Agent, or Firm*—Wayland H. Riggins; L. D. Wofford, Jr.; John R. Manning

[57] ABSTRACT

A quick disconnect filter coupling for use in coupling a pair of lines together through which fluid passes. The device includes a male cylindrical housing having an enlarged longitudinal bore therein into which a filter cartridge is removably carried. The filter cartridge includes a filter medium and a check valve. A purge assembly can be attached to the male cylindrical housing for flushing such with a cleansing fluid when changing the filter cartridge.

1 Claim, 4 Drawing Figures

3,910,307

QUICK DISCONNECT FILTER COUPLING

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a coupling device and more particularly to a quick disconnect coupling device that includes a filtering apparatus.

While coupling devices such as for transferring fuel and the like from a remote supply to a missile that is to be launched have been utilized in the past, these devices are not practical for future generations of space travel due to the problem of cleaning and removing all the contaminants therefrom prior to reuse. In the space shuttle program it is anticipated that a space vehicle will take approximately one hundred flights rather than the single launch such as has taken place heretofore.

One problem encountered is that the individual umbilical couplings that have heretofore been utilized must be cleaned prior to the next flight. The present procedure for cleaning a coupling on existing space vehicles is to remove the unit from the vehicle which requires separating the downstream tubing connections (flared type or welded). When a new or clean coupling is reinstalled a downstream filter is also replaced and the system leaktested. Since there are approximately fifteen couplings leading from a service platform to a space vehicle, it can be seen that the turn-around time for readying a missile for another flight is considerable.

SUMMARY OF THE INVENTION

The invention comprises a quick disconnect filter coupling for collectively, disconnecting and connecting a pair of fluid carrying lines together. The device includes a male cylindrical housing having an enlarged cylindrical bore therein. One of the fluid carrying lines is connected to one end of the male cylindrical housing. A filter cartridge having an elongated bore extending therethrough is carried in said male housing. A filter medium is carried in the elongated bore for filtering the fluid flowing therethrough and a check valve is carried therein for limiting the passage of the fluid to one direction. A female cylindrical housing is connected to the other fluid carrying line. The male cylindrical housing has an external diameter smaller than the internal diameter of the female cylindrical housing so that the male housing with the filter cartridge therein can be inserted within the female housing. The male housing is adapted to receive a purging assembly so that the coupling can be purged with a cleansing fluid when changing the filter cartridge.

Accordingly, it is a general object of the present invention to provide a quick disconnect filter coupling.

Still another important object of the present invention is to provide a coupling wherein a filter cartridge can be readily removed therefrom and the coupling purged with a cleansing fluid.

These and other objects and advantages of the invention will become apparent upon reference to the following specification, attendant claims and drawings.

DESCRIPTION OF THE PREFERRED EMBODIMENT

Figure 1:
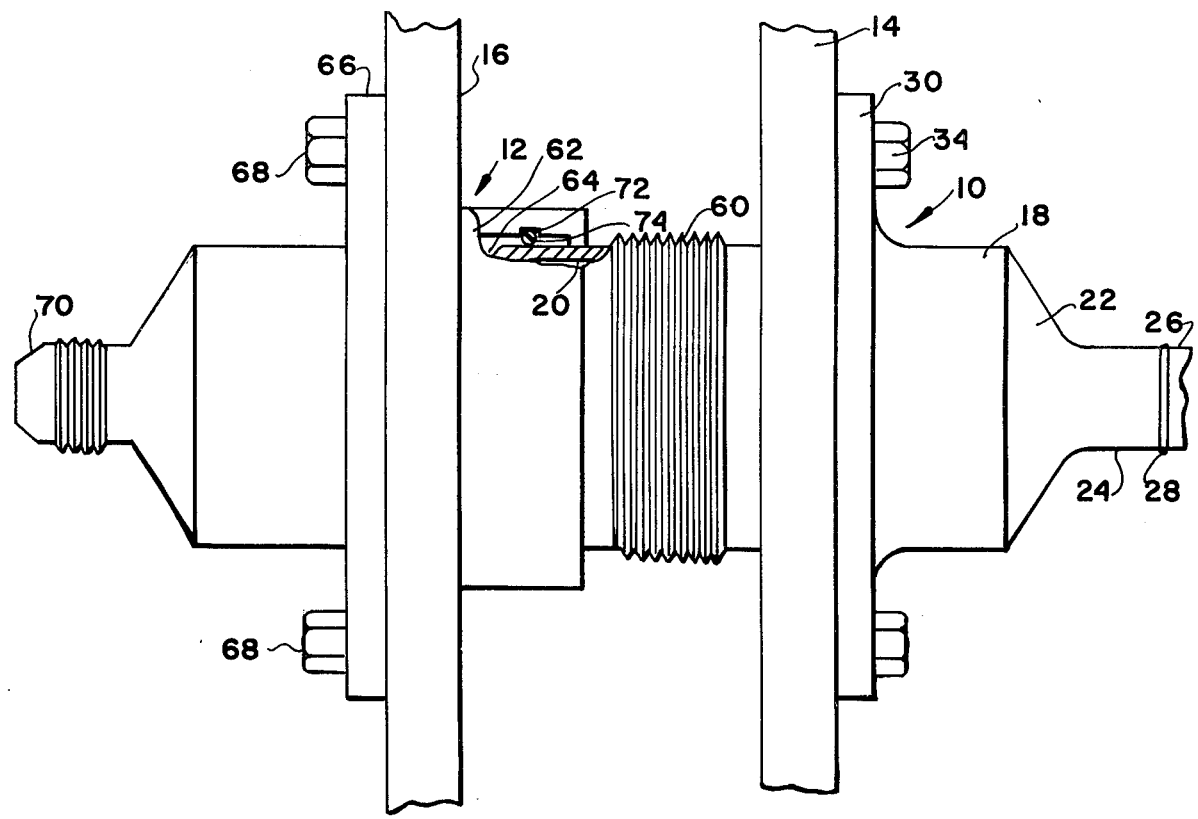
FIG. 1 is a side elevational view partially in section illustrating a coupling device constructed in accordance with the present invention mounted between a pair of mounting plates.

Referring in more detail to FIG. 1 of the drawings there is illustrated a coupling assembly constructed in accordance with the present invention which includes a male half generally designated by the reference character 10 and a female half generally designated by the reference character 12 installed in an umbilical assembly. When the coupling device is utilized in a space vehicle usually the male half 10 of the coupling device is mounted to the wall 14 of the space vehicle. The female half 12 of the coupling device is, in turn, bolted to a mounting plate 16 which is moved laterally prior to the launching of the space vehicle. The male portion 10 of the coupling device includes an elongated cylindrical housing 18 which has an enlarged longitudinal bore 20 extending therethrough. The outer end of the housing 18 tapers inwardly as at 22 to a smaller diameter end portion 24 which is connected to a fuel line 26 by a weld 28.

Flanges 30 extend outwardly from the cylindrical housing 18 and have circumferentially spaced holes 32 provided therein for receiving a bolt 34 for securing the male half 10 of the coupling device to the vehicle wall 14.

A filter cartridge 36 is removably carried within the longitudinal bore 20 of the housing 18 and has a threaded portion 38 provided on the wall thereof which threads into internal threads 40 provided on the inner wall of the housing 18. The filter cartridge includes an elongated cylindrical housing 42 which has a retainer cap 44 threaded onto the inner end thereof. The retainer cap 44 is provided for securing a disk-shaped filter 46 within the housing 42. The other side of the disk-shaped filter 46 abuts against an inwardly extending ridge 48. The filter medium can be any suitable filter material and such would vary according to the material being filtered.

Figure 2:
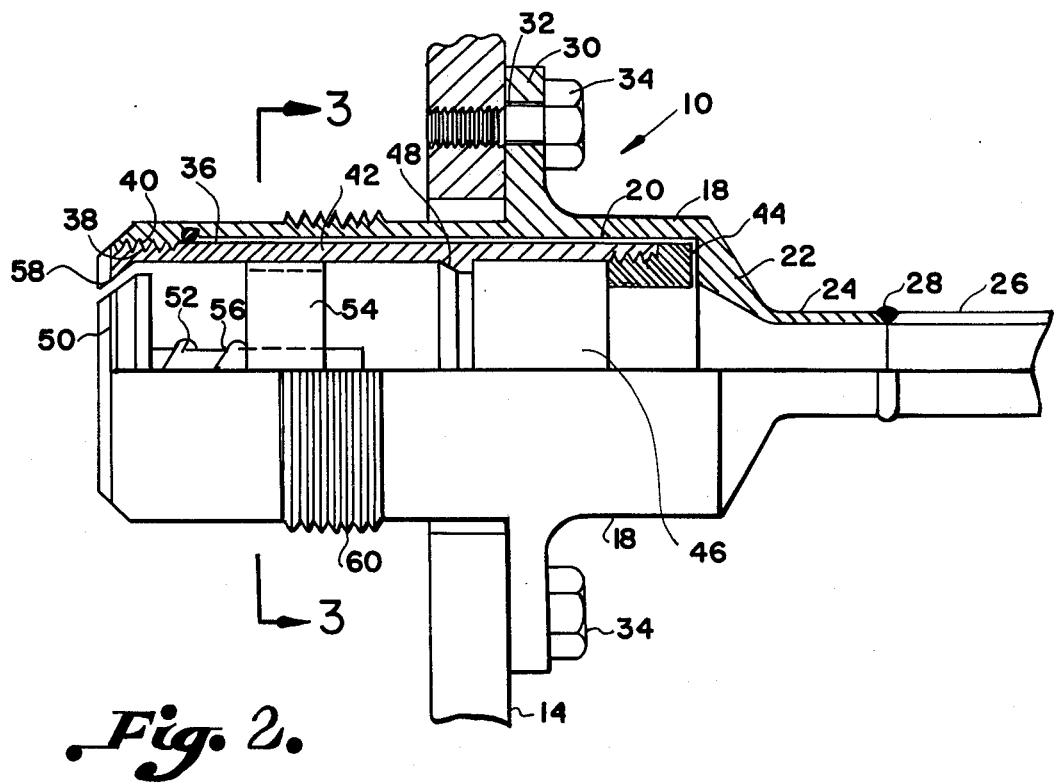
FIG. 2 is an enlarged side elevational view with parts in section illustrating a male half of the coupling device of FIG. 1.
Figure 3:
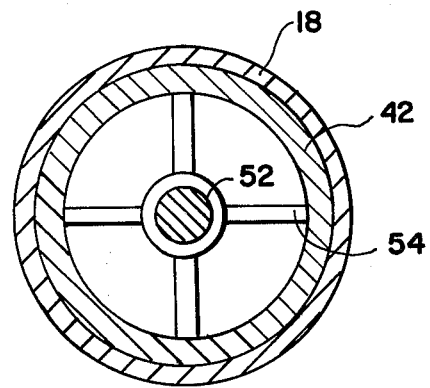
FIG. 3 is a cross-sectional view taken along the line 3—3 of FIG. 2.

Carried adjacent the outer end of the cartridge 36 is cartridge check valve 50 mounted on the end of a plunger 52. The plunger 52 extends through a bore provided in a web-shaped configuration 54. A spring 56 extends between the web-shaped portion 54 and the bottom side of the valve 50 for forcing the valve 50 outwardly. As can be seen in FIG. 2, the outer end of the filter cartridge tapers inwardly at 58 so that a tapering outer surface of the check valve 50 abuts snugly thereagainst to prevent the flow of fluid from right to left through the filter cartridge. As can be seen the fluid is permitted to flow from left to right through the filter catridge since the valve 50 is forced to the right overcoming the tension in the spring 52. Circumferentially extending threads 60 are carried on the outer surface of the housing 18 and the function of such will be described more fully below.

The female half of the coupling also includes a cylindrical elongated housing 62 having a longitudinal bore 64 extending therethrough. A radially extending flange 66, through which holes are provided for receiving bolts 68, are used for bolting the coupling 12 to the mounting plate 16. The inner end of the female half 12 of the coupling is reduced to a small diameter portion 70 for being readily coupled to a pipe through which the fluid to be delivered to the space vehicle passes. A groove 72 is provided in the inner wall of the housing 62 for accommodating O-ring 74 which seals against the housing 18 of the male assembly 10 when the plates 14 and 16 are brought together such as illustrated in FIG. 1.

After the space shuttle has returned to earth it may be placed back on the launch pad. In order to ready such for another flight it is only necessary to remove the cartridge assembly carried within the male half 10 of the coupling. After the cartridge assembly 36 has been removed, and before inserting a new one therein, it is often desirable to completely flush out the male portion of the coupling so as to eliminate any contaminants that may be therein.

Figure 4:
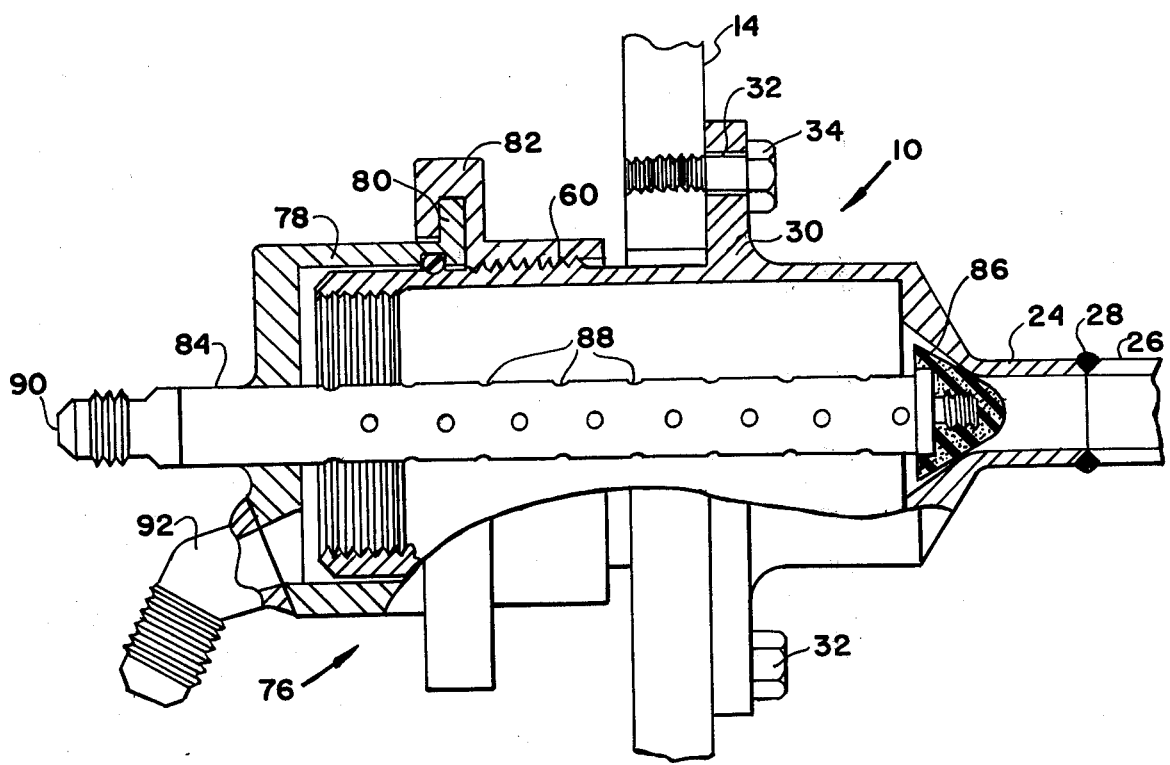
FIG. 4 is a side elevational view partially in section illustrating a purge assembly coupled to a female half of the coupling of FIG. 1.

A purge assembly, generally designated by the reference character 76, such as illustrated in FIG. 4 is utilized for accomplishing this purpose. The purge assembly includes a circular housing 78 which has a radially extending flange 80 provided thereon. A rotatable nut 82 extends over the flange 80 and has internal threads thereon which engage the threads 60 carried on the housing 18 for securing the purge assembly 76 to the male portion 10 of the coupling. An elongated perforated member 84 extends axially through the circular housing 78 into the male portion 10 of the coupling. Positioned on the inner end of the elongated tubular member 84 is a soft seal 86 that fits flush against the reduced portion 24 of the male housing for providing a positive seal therebetween. The perforated tubular member 84 has a plurality of spaced holes 88 provided therein. A cleansing fluid is supplied to an inlet 90 provided on an outer end of the elongated tubular member 84 for being expelled through the holes 88 into the interior of the male coupling member 10. An outlet port 92 is provided in the circular housing 78 for removing the cleansing fluid and any impurities collected thereby from the interior of the coupling device.

Thus, it can be seen that in order to ready a space vehicle for another flight it is only necessary to remove the cartridge assembly 36, attach the purging device, force a cleansing fluid through the coupling device and place a new cartridge into the male portion 10 of the coupling.

It can be seen that the exterior diameter of the male portion 10 is slightly less than the interior diameter of the female portion 12 so as to permit the male portion to be inserted readily therein.

While a preferred embodiment of the invention has been described using specific terms, such description is for illustrative purposes only, and it is to be understood that changes and variations may be made without departing from the spirit or scope of the following claims.

What is claimed is:

1. A quick disconnect filter coupling for selectively connecting and disconnecting a pair of fluid carrying lines together comprising:

a male cylindrical housing having an enlarged longitudinal bore therein;

one of said lines being connected to one end of said male cylindrical housing;

a filter cartridge carried within said longitudinal bore and being coextensive in length with said longitudinal bore and threadedly removable therefrom;

said filter cartridge including an elongated housing;

an elongated bore extending through said housing through which fluid flows;

said elongated bore having a filter receiving compartment adjacent the inner end of said elongated housing;

a filter medium carried in said compartment for filtering said fluid flowing through said cartridge;

a retainer cap threaded onto said inner end of said housing for securing said filter in said compartment;

a check valve carried in said elongated bore adjacent the outer end of said elongated housing for permitting the passage of fluid in one direction;

a tapered interior exit portion at the inner end of said male cylindrical housing merging with the inner end of said longitudinal bore thereof adapted for receiving a tapered seal of a purge assembly;

external threads carried on said male cylindrical housing whereby a purge assembly may be alternately attached to said male cylindrical housing; and a female cylindrical housing having an enlarged longitudinal bore;

said male cylindrical housing having an external diameter smaller than an internal diameter of said female cylindrical housing so that said male housing with said filter cartridge therein can be inserted in said female housing.

* * * * *